US007077650B2

(12) United States Patent
Johnstone

(10) Patent No.: US 7,077,650 B2
(45) Date of Patent: Jul. 18, 2006

(54) EXTENDABLE AND RETRACTABLE UTILITY LINE SYSTEM

(76) Inventor: Charles R. Johnstone, 2451 Maple St., River Grove, IL (US) 60171

( * ) Notice: Subject to any disclaimer, the term of this patent is extended or adjusted under 35 U.S.C. 154(b) by 218 days.

(21) Appl. No.: 10/803,060

(22) Filed: Mar. 17, 2004

(65) Prior Publication Data

US 2005/0208451 A1 Sep. 22, 2005

(51) Int. Cl.
*A61C 13/38* (2006.01)
*A61G 15/00* (2006.01)

(52) U.S. Cl. .................................... 433/78; 137/355.17

(58) Field of Classification Search .................. 433/78; 137/355.17

See application file for complete search history.

(56) References Cited

U.S. PATENT DOCUMENTS 1,458,115 A 6/1923 Caldwell
1,518,881 A 12/1924 Walker et al.
1,928,173 A 9/1933 Holmgreen
2,026,327 A 12/1935 Sparling
2,118,294 A 5/1938 Cox
2,157,887 A 5/1939 Davis
2,168,951 A 8/1939 Caldwell
2,174,099 A 9/1939 Vogler et al.
2,225,859 A 12/1940 Cox
2,984,714 A 5/1961 Kunkle
3,180,585 A 4/1965 Pusey et al.
3,372,883 A 3/1968 Ota
3,427,719 A 2/1969 Gordon et al.
3,429,516 A * 2/1969 Sharp et al. ............. 242/388.9
3,487,850 A 1/1970 Wahler et al.
3,514,171 A 5/1970 McGaha
3,793,729 A 2/1974 Nyboer
3,874,488 A 4/1975 Wirth
4,023,387 A 5/1977 Gould
4,174,816 A * 11/1979 Olson .......................... 242/272
4,235,419 A 11/1980 Schuck
5,117,859 A 6/1992 Carlson
5,450,874 A 9/1995 Hamula
5,775,354 A 7/1998 Upton
6,199,579 B1 3/2001 Taylor et al.

* cited by examiner

*Primary Examiner*—Ralph A. Lewis
*Assistant Examiner*—Casey Donahoe
(74) *Attorney, Agent, or Firm*—Meroni & Meroni, P.C.; Charles F. Meroni, Jr.; Christopher J. Scott

(57) ABSTRACT

The present invention provides a utility line extension and retraction system for enabling users thereof to selectively extend a utility line for utility line use and retract the utility line for utility line storage. The utility line extension and retraction system essentially comprises a plurality of utility line cassettes. Each utility line cassette essentially comprises two laterally-spaced, pulley-receiving walls, an anterior line outlet end, a posterior line inlet end, a stationary pulley assembly adjacent the anterior line outlet end; a traveling pulley assembly intermediate the anterior line outlet end and the posterior line inlet end, and a utility line extending from the posterior line inlet end to the anterior line outlet end, which line imparts motion to the traveling pulley assembly. The traveling pulley assembly travels along a closed path comprising an ascension path, a descension path, and an extended-state rest stop intermediate the ascension and descension paths.

35 Claims, 6 Drawing Sheets

EXTENDABLE AND RETRACTABLE UTILITY LINE SYSTEM

BACKGROUND OF THE INVENTION

1. Field of the Invention

The present invention generally relates to an apparatus for selectively extending and retracting a utility line, hose, or the like. More particularly, the present invention relates to an apparatus for selectively extending a dental utility line for utility line use and selectively retracting a dental utility line for utility line storage.

2. Description of the Prior Art

The prior art is replete with examples of apparatus and systems for enabling users to selectively extend and retract a utility line, hose, or cord. The dental industry, in particular, requires utility lines for the actuated use of a variety of dental instruments and appliances and thus has been offered a variety of means for selectively extending and selectively retracting utility lines in the office. It has been noted that when an effective dental utility line storage system (that enables the user to selectively extend a line for use and selectively retract a line for storage) is not employed in a dental practice setting, the dental utility lines often become entangled with one another or damaged by everyday office behavior, such as by being trampled under foot or by rolling chairs and the like. Added to the potential for damage and entanglement is the rather unsightly appearance of utility lines. Dental practitioners typically strive to enhance the appeal of their offices since the services they perform can often be rather unpleasant and thus a means for storing utility lines behind the scenes is preferable to allowing utility lines to be open for unsightly inspection. The prior art thus teaches a variety of devices or systems to effectively store dental utility lines and allow selective extension and retraction thereof for generally enhancing the dental office visit. Some of the more pertinent prior art relating to these subjects is described hereinafter.

U.S. Pat. No. 3,180,585 ('585 Patent), which issued to Pusey et al., discloses an Extendable and Retractable Utility Line Apparatus. The '585 Patent teaches an extendable utility line apparatus providing automatic retraction for an extended line. The extendable utility line apparatus comprises a console cabinet having a hinged cover, a series of broad and relatively shallow structural channels of smooth-faced material removably mounted in the cabinet and disposed back to open mouth so as to define a corresponding series of vertically disposed and elongate smooth-wall pockets. The upper end of the back of each channel projects upwardly beyond its sides. A bottom grooved spanning board is slidably mounted within the cabinet and normally extends across the upper ends and slidably receives the end within its grooves for firmly positioning the channels within the cabinet. A utility line for each pocket extends into the upper end of the pocket, dipping low into the pocket in retracted position and looping back to return to the upper end of the pocket to emerge therefrom and extend through the hinged cover. Further disclosed are means for supporting the emergent upper end of the retracted utility line against being withdrawn through the cover and into the pocket. A freely floating sheave, having no connection with the pocket-defining structure, is disposed within the loop of the utility line for riding upwardly in the pocket with the loop as a guide and retainer when the utility line is extended, and for dropping down with the loop when the line is released. The line thus retracts automatically under the influence of gravity, the sheave having sound absorbent material laterally thereof as a silencer.

U.S. Pat. No. 3,427,719 ('719 Patent), which issued to Gordon et al., discloses a Dental Unit. The '719 Patent teaches a dental instrument unit comprising in combination an extendable utility line having a dental instrument thereon, the extendable utility line being anchored within a cabinet and being trained over a pulley on a movable piston within the cabinet. Further the line is trained over a fixed pulley to extend outside of the cabinet. Vacuum means may be applied to the piston to retract the utility line.

U.S. Pat. No. 3,429,516 ('516 Patent), which issued to Sharp et al., discloses Dental Equipment. The '516 Patent teaches a support for dental equipment of the type that has a flexible hose connected at one end with an instrument and at the opposite end with a hose activation or actuation means. The hose is suspended in a loop between a pair of upright guides. A weighted pulley rides in the loop of the hose and is supported by the upright guides. The pulley assembly applies tension to the hose to draw the instrument end of the hose into the cabinet where the support is mounted. The instrument end of the hose passes through a tube at the top of the cabinet and the outer end of the tube supports the instrument in position for being grasped by the user. A catch mechanism on the pulley assembly latches the pulley assembly temporarily at the top of the guides to relive the tension in the hose. The catch may be readily unlatched by pulling on the instrument end of the hose. The weight of the pulley assembly then draws the instrument end of the hose into the cabinet.

U.S. Pat. No. 3,793,729 ('729 Patent), which issued to Nyboer, discloses a Gripping Device Assembly for Tensioned Pliable Elongate Member. The '729 Patent teaches an assembly used in conjunction with a hand-holdable instrument that has an elongate pliable member extending therefrom to a source of power that serves to actuate the instrument. The assembly comprises a housing that is located in a fixed base position relative to the source of power, and the housing having the elongate pliable member extending therein. The confined space is partially defined in the housing by a top and bottom, with the bottom including an inclined surface on which a rotatable member is movably supported. Means for maintaining tension on the elongate pliable member are disposed between the source of power and the housing.

The housing is preferably capable of removably supporting the instrument at a first position thereon. When the instrument is moved outwardly from the housing without the pliable elongate member contacting the rotatable member, tension is maintained on the elongate member until the instrument is moved downwardly to bring the elongate member into friction contact with the rotatable member. The instrument is then allowed to move toward the housing a short distance due to the tension on the elongate member, with the rotatable member now rolling up the inclined surface to frictionally grip the pliable elongate member between the rotatable member and the top of the housing. The portion of the elongate member extending outwardly from the housing to the instrument is now free of tension and the instrument may be maneuvered without any restraint thereon. After the instrument has been used, the instrument is returned to the first position by reversing the above-described steps.

U.S. Pat. No. 5,450,874 ('874 Patent), which issued to Hamula, discloses a Dental Instrument Hose Retraction Device. The '874 Patent teaches a device for retracting and storing a length of hose. The device is housed within a dental cabinet and includes a rectangular compartment formed by integral side walls and front and rear walls. A plurality of spool supports is positioned adjacent to the side walls. A spool is positionable within the compartment. A length of hose anchored at the rear wall is routed under the spool and through an opening in an instrument panel of the dental cabinet. At the distal end of the hose is attached the desired dental tool. In retracted position, the hose hangs in a loop or bight with the spool supported on the bight. The weight of the spool normally keeps the hose under tension. The device is operated by pulling on the distal end of the hose such that the spool is lifted onto and secured by the spool supports. In this position, tension is released from the hose. The hose is retractable by exerting a quick jerk or pull on the distal end of the hose which dislodges the spool from the spool support causing the spool to displace vertically down into the compartment, exerting a downward force on the hose to retract it.

It will thus be noted that the prior art teaches a variety of mechanisms for allowing dental practitioners to both store a plurality of utility lines and further to selectively extend and retract each of the utility lines for operative use. It will be noted that a variety of pulley assemblies have been developed to enhance the effectiveness of the utility line extension and retraction systems. Further, the prior art teaches a variety of means for braking the utility line when in a fully extended, operative state. A number of retraction means are also taught by the prior art. From a thorough inspection of the prior art, it will be seen, however, that none of the prior art teach a uniquely configured traveling pulley assembly track comprising an ascension path for utility line extensions and a separate and distinct descension path for utility line retractions.

Further, it is noted that prior art braking systems employing line-cinching or line-pinching means for braking the utility line are deficient for various reasons. In this regard, it has been noted that cinch or pinch-type braking means, which attempt to hold utility lines in an extended state for utility line use often fail to properly grab or hold the utility line in place for utility line use. See, for example, the '729 Patent. Cross sectional configurations of utility lines vary in practice, there being a number of different types of utility lines for actuating different types of dental instruments. These utility lines often rotate about the axis extending therethrough and thus means for cinching or pinching the line in place often fail to properly make sufficient frictional contact with the utility line for holding the same in place. Further, these systems may compromise the effectiveness of the utility line by kinking the line or by damaging the line from repeated pinched engagement. Thus, it is contemplated that braking systems that do not rely upon line-cinching or line-pinching braking means are to be preferred over those that do.

While the '874 Patent teaches braking means that do not comprise line-cinching or line-pinching means for braking a utility line, the '874 Patent does not teach a positive tracking system with transitional lock or transitional brake means. It will be seen from an inspection of the '874 Patent that the hose is retractable by exerting a quick jerk or pull on the distal end of the hose which dislodges the spool from the spool support causing the spool to displace vertically down into the compartment, exerting a downward force on the hose to retract it.

From a review of the above-referenced patents and other prior art generally known to exist, it will be seen that the prior art does not teach a positive tracking system, comprising a closed path with transitional braking means along the closed path. It will be further seen that the prior art does not teach a selectively extendable and selectively retractable utility line system comprising non-frictional braking means. The prior art thus perceives a need for a selectively extendable and selectively retractable utility line system comprising positive tracking with smooth transitional brake means for enhancing utility line extensions and utility line retractions.

SUMMARY OF THE INVENTION

Accordingly, it is an object of the present invention to provide a selectively extendable and selectively retractable utility line system for enabling users thereof to effectively extend utility lines for utility line use and further to effectively retract utility lines for utility line storage. It is a further object of the present invention to provide novel utility line braking means for selectively holding the extended utility line in an extended state during utility line use. In this regard, it is a further object of the present invention to provide a unique pulley-receiving track comprising a distinct ascension path, a distinct extended-state rest stop or brake point, and a distinct descension path for respective utility line extensions, utility line usage, and utility line retractions.

To achieve these and other readily apparent objectives, the present invention provides a utility line extension and retraction system or utility line extension and retraction cassette assembly for enabling users thereof to selectively extend a utility line for utility line use and retract the utility line for utility line storage. The utility line extension and retraction system essentially comprises a plurality of utility line cassettes. Each utility line cassette essentially comprises two laterally-spaced, pulley-receiving walls; spacer means intermediate the pulley-receiving walls, an anterior line outlet end; a posterior line inlet end; a stationary pulley assembly adjacent the anterior line outlet end; a traveling pulley assembly intermediate the anterior line outlet end and the posterior line inlet end; and a utility line extending from the posterior line inlet end to the anterior line outlet end.

Each pulley-receiving wall comprises an inner wall surface, an outer wall surface, and a pulley-receiving groove situated intermediate the inner wall and outer wall surfaces. The pulley-receiving grooves together cooperatively form the pulley-receiving track. The pulley-receiving track comprises an inferior track path, a superior track region, and a pulley guide junction intermediate the inferior track path and the superior track region. The superior track region essentially comprises a closed path comprising an anterior track path or ascension path, a posterior track path or descension path and superior path track with transitional braking means or an extended brake stop intermediate the anterior track path and the posterior track path. The extended-state rest stop effectively provides cinch-less or pinch-less braking structure so as to effectively brake the utility line when it is in extended utility line use.

The traveling pulley assembly comprises a first pulley and track-traveling means. The first pulley comprises an inferior pulley region, a central traveling hub aperture, and a first utility line-accepting groove. The central traveling hub aperture has a traveling hub axis about the first pulley may rotate. The track traveling means are located within the central traveling hub aperture for enabling the traveling pulley assembly to travel along the pulley-receiving track. The stationary pulley assembly comprises a second pulley and cassette attachment means. The cassette attachment means are designed to rotatably attach the stationary pulley assembly to the pulley-receiving walls. The second pulley comprises a superior pulley region, a central stationary hub, and a second utility line-accepting groove. The utility line is trained through the utility line accepting grooves from the posterior line inlet end to the anterior line outlet end.

Thus, as the utility line is extended, the utility line length imparts varying forces to the traveling pulley assembly to cause the same to travel along the pulley-receiving track. When the utility line is in a fully extended state, the traveling pulley assembly comes to rest in the extended-state rest stop. When the user wishes to retract the utility line, the user imparts a tensile force to the utility line to cause the traveling pulley assembly to start from the extended-state rest stop and continue along the pulley-receiving track. The pulley-receiving track is bi-directional along the inferior track path and uni-directional along the superior track region. In other words, the traveling assembly both ascends and descends in the inferior track path, but travels along a one-way path when in the superior track region. It will thus be seen that the present invention provides a unique pulley-receiving track comprising a distinct ascension path, a distinct extended-state rest stop or brake point, and a distinct descension path for respective utility line extensions, utility line usage, and utility line retractions.

Other objects of the present invention, as well as particular features, elements, and advantages thereof, will be elucidated or become apparent from, the following description and the accompanying drawing figures.

BRIEF DESCRIPTION OF THE DRAWINGS

Other features of my invention will become more evident from a consideration of the following brief description of my patent drawings, as follows.

DETAILED DESCRIPTION OF THE PREFERRED EMBODIMENT

Figure 1:
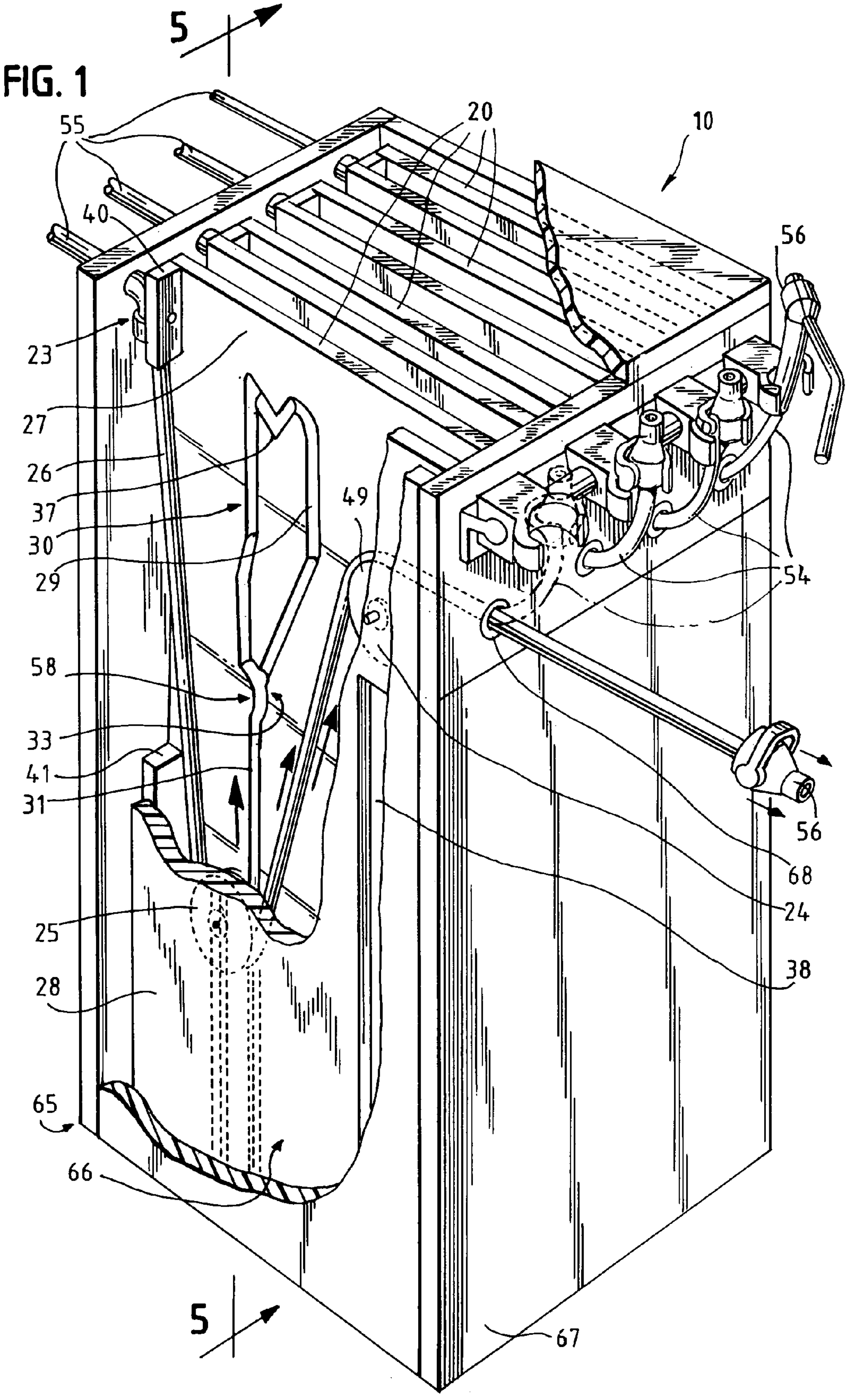
FIG. 1 is a perspective view of the preferred embodiment of the extendable and retractable utility line system with parts removed to show a plurality of side by side cassette assemblies, one of which is shown with parts removed to show inner components.

Referring now to the drawings, the preferred embodiment of the present invention concerns a utility line extension and retraction system or utility line extension and retraction cassette assembly for enabling users thereof to selectively extend a utility line for utility line use and retract the utility line for utility line storage. The utility line extension and retraction system 10 is generally illustrated and referenced in FIG. 1. It will be seen from an inspection of FIG. 1 that utility line extension and retraction system 10 essentially comprises a plurality of utility line cassettes 20 or cassette assemblies, which utility line cassette 20 or cassette assembly has further been illustrated and referenced in FIGS. 2, and 5–10. Each utility line cassette 20 preferably comprises two laterally-spaced, pulley-receiving walls 21 as illustrated and referenced in FIGS. 2–10; spacer means intermediate the pulley-receiving walls; an anterior line outlet end 22 as illustrated and referenced in FIGS. 2 and 5–10; a posterior line inlet end 23 as illustrated and referenced in FIGS. 1, 2, 5, and 7–10; a stationary pulley assembly 24 adjacent the anterior line outlet end as illustrated and referenced in FIGS. 1, 3, 5, and 7–10; a traveling pulley assembly 25 intermediate anterior line outlet end 22 and posterior line inlet end 23 as illustrated and referenced in FIGS. 1, 2, and 4–10; and a utility line 26 extending from posterior line inlet end 23 to anterior line outlet end 22 as illustrated and referenced in FIGS. 1, and 5–10.

Each pulley-receiving wall 21 is preferably constructed from 0.375-inch thick Type 1 (gray) PVC and comprises an inner wall surface 27 as illustrated and referenced in FIGS. 1–3, and 5–10, and an outer wall surface 28 as illustrated and referenced in FIGS. 1, 3, 4, and 6. Each pulley-receiving wall 21 is preferably L-shaped as may be seen from a general inspection of FIGS. 5, 7, 9, and 10. The preferred dimension from anterior line outlet end 22 to posterior line inlet end 23 is approximately 12 inches. The preferred dimension from the superior most edge of each pulley-receiving wall 21 to the inferior most edge of each pulley-receiving wall 21 is approximately 28 inches. Notably, however, the resulting height of each utility line cassette 20 may be tailored to the needs of the consumer. In this regard, the dimension from the superior most edge of each pulley-receiving wall 21 to the inferior most edge of each pulley-receiving wall 21 may vary. The inferior most edge (or the length along the back of the L-shape) may be shortened or lengthened per the desired specification. The preferred width of the back of the L-shape is about 9 inches and the preferred width of the foot (or head) of the L-shape is about 6.5 inches.

A pulley-receiving groove 29 or pulley-receiving structure is situated intermediate each inner wall surface 27 and outer wall surface 28 as illustrated in FIGS. 1, 2, 4, 5, and 7–10. Pulley-receiving grooves 29 are each formed by creating grooves in pulley-receiving walls 21 about 0.25 inches in depth. It will be seen from an inspection of the noted drawing figures that pulley-receiving grooves 29 cooperatively form a pulley-receiving track 30 as also generally illustrated and referenced in FIGS. 1, 2, 4, 5, and 7–10. Pulley-receiving track 30 preferably comprises an inferior track path 31 as illustrated in FIGS. 1, 2, 5, 7, 9, and 10; a superior track region 32 as generally illustrated and referenced in FIGS. 5 and 8; and a pulley guide junction 33 intermediate inferior track path 31 and superior track region 32 as illustrated and referenced in FIGS. 1, 2, 7, and 9. Superior track region 32 preferably comprises an ascension track path or preferably an anterior track path 34; a descension track path or preferably a posterior track path 35, and a superior track path 36 intermediate anterior track path 34 and posterior track path 35 all as illustrated and referenced in FIGS. 2, 5, 7–10. It will be understood from an inspection of the noted drawing figures that anterior track path 34, posterior track path 35, and inferior track path 31 preferably intersect at pulley guide junction 33. Superior track path 36 further preferably comprises an extended-state rest stop 37 as generally illustrated and referenced in FIGS. 1, 2, and 5. Further, from an inspection of FIG. 9, it will be understood that extended-state rest stop 37 is essentially a V-shaped groove or valley into which traveling pulley assembly 25 seats or rests when utility line 26 is in a fully extended state. Thus, extended-state rest stop 37 is designed to effectively provide cinch-less or pinch-less braking structure so as to effectively brake utility line 26 when utility line 26 is in extended utility line use. Pulley-receiving track 30 thus comprises a bi-directional inferior track path 31 and a closed, uni-directional superior path. In other words, the traveling assembly both ascends and descends in inferior track path 31, but travels along a one-way path when in superior track region 32. It should be further noted that inferior track path 31 is preferably substantially linear. Thus, alteration of the length or height of each pulley-receiving wall 21 according to the requirements of the end user will not materially affect the traveling behavior of traveling pulley assembly 25 in inferior track path 31.

Figure 15:
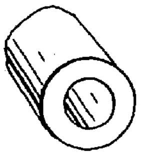
FIG. 15 is a fragmentary cross-sectional perspective view of High Vacuum Evacuator (HVE) type tubing or utility line.
Figure 12:
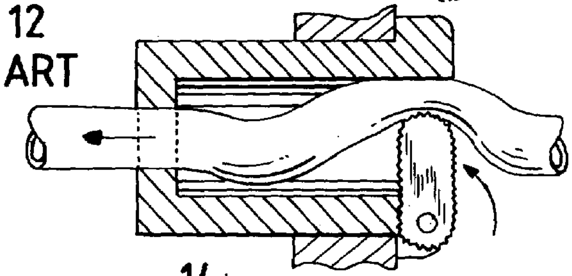
FIG. 12 PRIOR ART
FIG. 12 is a fragmentary cross-sectional side view of the first prior art braking system shown in FIG. 11.
Figure 16:
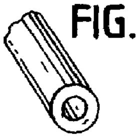
FIG. 16 is a fragmentary cross-sectional perspective view of Saliva Ejector Valve (SEV) type tubing or utility line.
Figure 17:
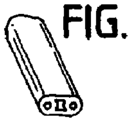
FIG. 17 is a fragmentary cross-sectional perspective view of 3-Way Syringe type tubing or utility line.
Figure 18:
FIG. 18 is a fragmentary cross-sectional perspective view of Hand-Piece type tubing or utility line.
Figure 13:
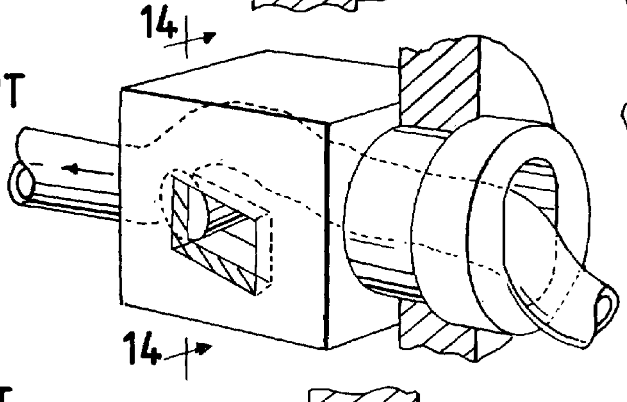
FIG. 13 PRIOR ART
FIG. 13 is a fragmentary perspective view of a second prior art utility braking system with parts removed to show a circular cross-sectioned member juxtaposed and in frictional, pinched contact with a utility line.
Figure 14:
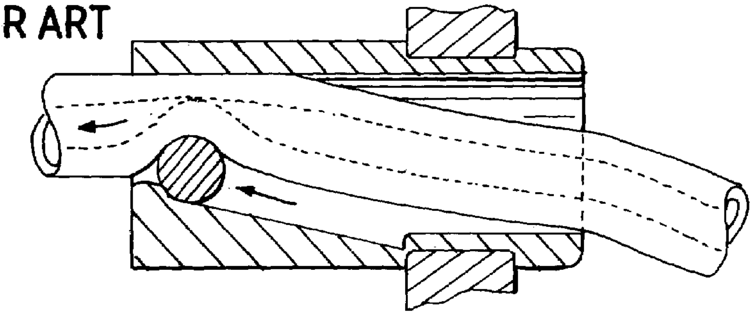
FIG. 14 PRIOR ART
FIG. 14 is a fragmentary cross-sectional side view of the second prior art braking system shown in FIG. 13.

Utility line 26 varies in cross-sectional orientation as generally illustrated in FIGS. 15–18 inclusive. FIG. 15 is a fragmentary cross-sectional perspective view of High Vacuum Evacuator (HVE) type tubing or utility line; FIG. 16 is a fragmentary cross-sectional perspective view of Saliva Ejector Valve (SEV) type tubing or utility line; FIG. 17 is a fragmentary cross-sectional perspective view of 3-Way Syringe type tubing or utility line; and FIG. 18 is a fragmentary cross-sectional perspective view of Hand-Piece type tubing or utility line. While all utility lines 26 are typically constructed from vinyl type tubing, the cross sectional structure varies depending on the application. Given a dental practice, for example, different types of tubing may include High Vacuum Evacuator (HVE) type tubing, Saliva Ejector Valve (SEV) type tubing, 3-Way Syringe type tubing, and Hand-Piece tubing. A cross-sectional view of HVE type tubing has been illustrated in FIG. 15. The inner diameter of HVE type tubing (HVE type tubing is typically circular in cross section) typically comprises about a 0.5 inch diameter. As indicated, a cross-sectional view of SEV type tubing has been illustrated in FIG. 16. The inner diameter of SEV type tubing (SVE type tubing is also typically circular in cross section) typically comprises about a 0.1875-inch diameter. A cross-sectional view of 3-Way Syringe type tubing has been illustrated in FIG. 17. The dimensions of 3-Way Syringe type tubing are typically about 0.125 inches by 0.375 inches. A cross-sectional view of Hand-Piece type tubing has been illustrated in FIG. 18. It will be seen from an inspection of FIG. 18 that Hand-Piece type tubing comprises a cross section that is generally or substantially trapezoidal. In this regard, the typical trapezoidal cross section comprises a short side measuring about 0.25 inches, a long side measuring about 0.5 inches and a parallel distance intermediate the short side and the long side of about 0.375 inches.

Prior art utility line braking systems incorporate various types of line-cinching or line-pinching braking means for selectively holding a utility line in an extended state. The utility line tubing, however, tends to rotate about its axis when extended and retracted. The described prior art braking means employing line-cinching or line-pinching means for selectively holding a utility line in an extended state are problematic insofar as the tubing often becomes damaged and/or is not properly cinched or pinched (and thus braked). This shortcoming is particularly common when the tubing is of the Hand-Piece type. As will be understood from general consideration of FIGS. 11–14 (and FIG. 18) when line-cinching or line-pinching braking means are employed the cross-sectional structural configuration of the tubing does not always cooperate with the braking means to effectively hold an extended utility line in an extended state for utility line use. Thus, a non line-cinching or non line-pinching braking means is preferable to the prior art braking systems relying on these types of braking means. The present invention attempts to overcome these described shortcomings by introducing a braking system that is not reliant on line-cinching or line-pinching braking means.

Figure 4:
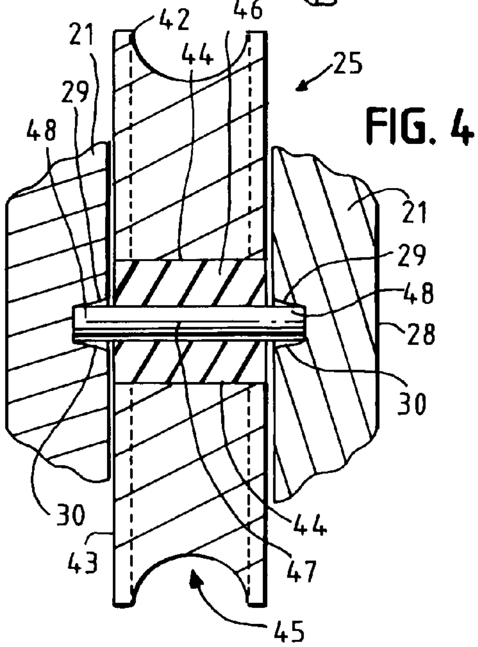
FIG. 4 is a fragmentary end view of the traveling pulley assembly as shown in FIG. 2 in an assembled state.

Traveling pulley assembly 25 preferably comprises a first pulley 42 as illustrated and referenced in FIGS. 2, and 4–10, and track-traveling means. First pulley 42 is preferably constructed from zinc-plated steel to provide a corrosion resistant, yet relatively weighty pulley as described in more detail hereinafter. It will be seen from an inspection of the noted drawing figures that first pulley 42 comprises an inferior pulley region 43, a central traveling hub aperture 44 (as illustrated and referenced in FIG. 4), and a first utility line-accepting groove 45 (as illustrated and referenced in FIGS. 2 and 4). Notably, central traveling hub aperture 44 has a traveling hub axis 44(*a*) about which first pulley 42 rotates as generally referenced in FIG. 2. The track traveling means are thus preferably located within central traveling hub aperture 44 for enabling traveling pulley assembly 25 to travel along pulley-receiving track 30. The track traveling means preferably comprise a shock-absorbing core 46 as illustrated and referenced in FIGS. 2 and 4, and a track-traveling pin 47 as illustrated and referenced most clearly in FIG. 4. It will thus be seen and understood from an inspection of the noted drawing figures that shock-absorbing core 46 is sized and shaped to snugly fit in central traveling hub aperture 44. Further, track-traveling pin 47 preferably comprises laterally opposite groove-engaging ends 48 as illustrated in FIG. 4, and a pin length intermediate groove-engaging ends 48. The pin length extends through shock-absorbing core 46 such that groove-engaging ends 48 are movably received in pulley-receiving track 30 for enabling traveling pulley assembly 25 to travel along pulley-receiving track 30. Groove-engaging ends 48 preferably extend from shock-absorbing core 46 approximately 0.25 inches so as to be received in pulley-receiving grooves 29 without allowing traveling pulley assembly to translate from side to side. Shock-absorbing core 46 is preferably constructed from rubber or similar other impact resistant material and track traveling pin 47 is preferably comprises a zinc-plated steel dowel pin to resist corrosion. Shock-absorbing core 46 thus functions to absorb impact of inner wall surfaces 21 as traveling pulley assembly 25 travels along the pulley-receiving track 30, particularly at pulley guide junction 33 when traveling pulley assembly 25 is traveling to the anterior track path 34 from inferior track path 31. It will be seen where anterior track path 34 and posterior track path 35 adjacent pulley guide junction 33 there exists a sharp pointed inner wall structure as typified by the resulting Y-junction. Shock-absorbing core 46 is designed to withstand repeated impact contact with the sharp Y-junction.

It is contemplated that first pulley 42 may comprise three different types of pulleys depending on the type of utility line 26 being used with cassette assembly 20 as previously outlined. If utility line 26 is either Saliva Ejector Valve (SEV)-type tubing or 3-Way Syringe-type tubing, it is contemplated that first pulley 42 preferably comprise a 2.625-inch diameter having an inferior pulley region 43 (as well as a first pulley, superior pulley region) measuring about 0.9375 inches. The diameter of central traveling hub aperture 44 further preferably measures about 0.75 inches. Together, the radial measurements of inferior pulley region 43, the first-pulley, superior-pulley region, and central traveling hub aperture 44 thus comprise the 2.625-inch preferred diameter. The preferred width of the 2.625-inch diameter first pulley 42 is about 0.75 inches. The preferred depth of first utility line-accepting groove 45 is about 0.375 inches. It will thus be seen that shock-absorbing core 46 preferably comprises a 0.75-inch diameter for snug insertion in central traveling hub aperture 44.

If utility line 26 is selected to be High Vacuum Evacuator (HVE) type tubing, it is contemplated that first pulley 42 preferably comprise a 3.625-inch diameter having an inferior pulley region 43 (as well as a first-pulley, superior-pulley region) measuring about 1.4375 inches. The diameter of central traveling hub aperture 44 further preferably remains constant at about 0.75 inches. Together, the radial measurements of inferior pulley region 43, the first-pulley, superior-pulley region, and central traveling hub aperture 44 thus comprise the 3.625-inch preferred diameter. The preferred width of the 3.625-inch diameter first pulley 42 is about 1 inch. The preferred depth of first utility line-accepting groove 45 remains constant at about 0.375 inches. Again, it will be seen that shock-absorbing core 46 preferably comprises a 0.75-inch diameter for snug insertion in central traveling hub aperture 44.

If utility line 26 is Hand Piece type tubing, it is contemplated that first pulley 42 preferably comprise a 3.375-inch diameter having an inferior pulley region 43 (as well as a first-pulley, superior-pulley region) measuring about 1.3125 inches. The diameter of central traveling hub aperture 44 further preferably remains constant at about 0.75 inches. Together, the radial measurements of inferior pulley region 43, the first-pulley, superior-pulley region, and central traveling hub aperture 44 thus comprise the 3.375-inch preferred diameter. The preferred width of the 3.625-inch diameter first pulley 42 is about 0.75 inches. The preferred depth of first utility line-accepting groove 45 remains constant at about 0.375 inches. Still further, it will be seen that shock-absorbing core 46 preferably comprises a 0.75-inch diameter for snug insertion in central traveling hub aperture 44.

Figure 2:
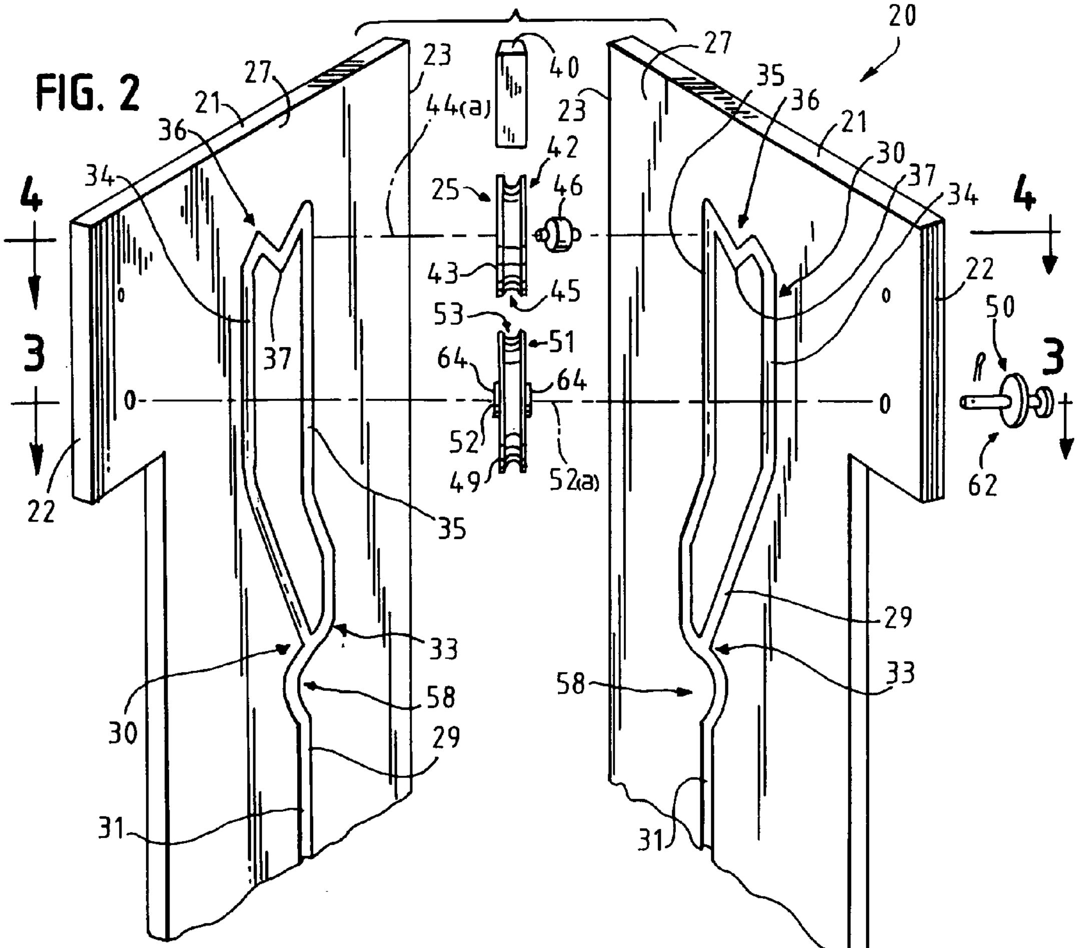
FIG. 2 is a fragmentary exploded end perspective view of a cassette assembly showing a traveling pulley assembly, a stationary pulley assembly and spacer means.
Figure 3:
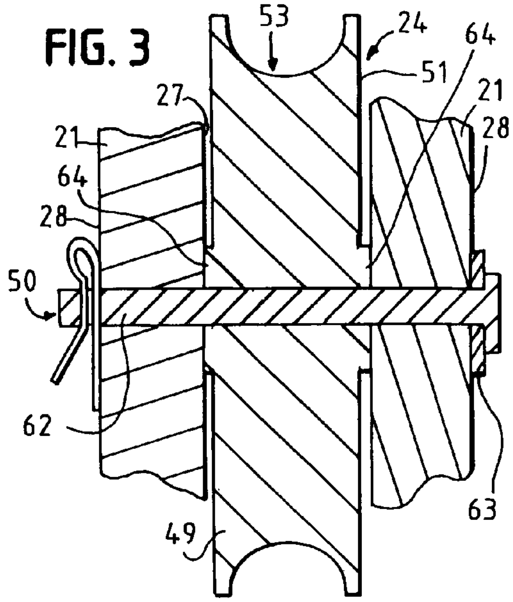
FIG. 3 is a fragmentary end view of the stationary pulley assembly as shown in FIG. 2 in an assembled state.
Figure 5:
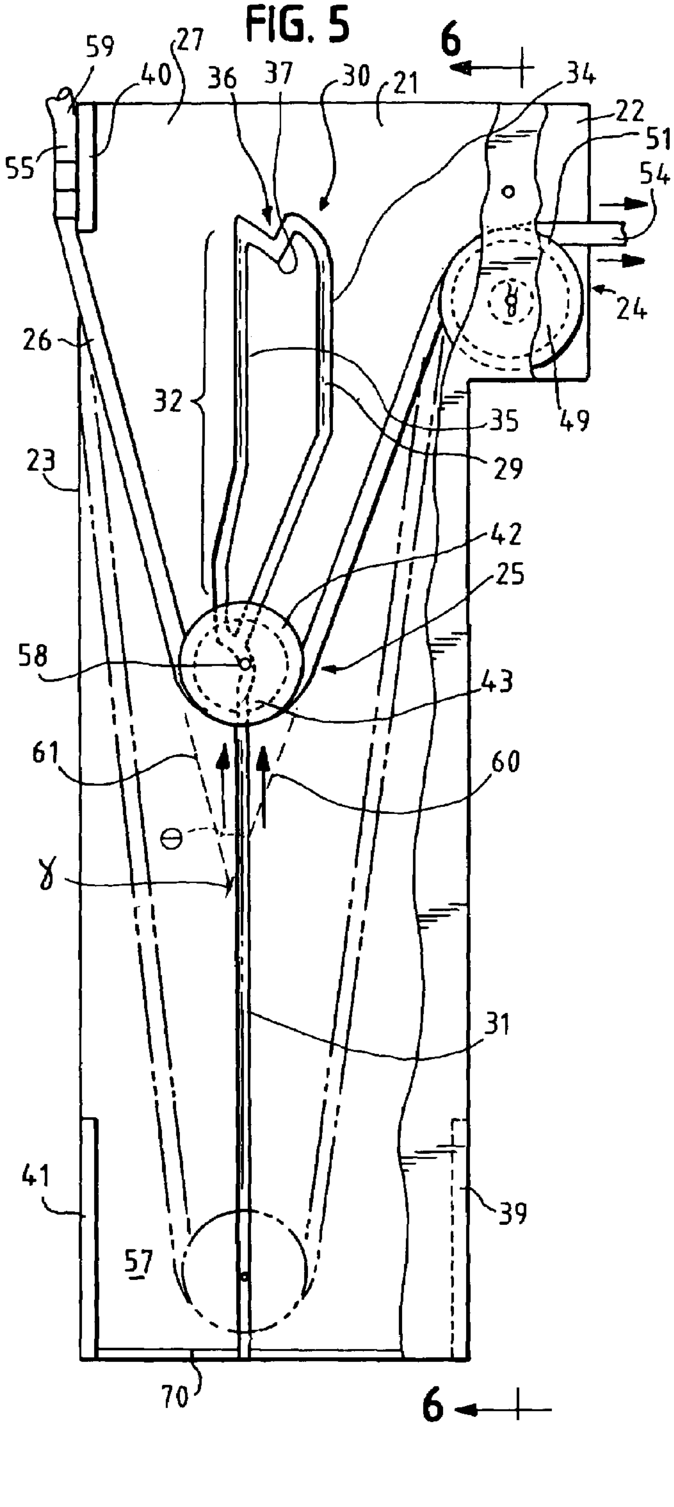
FIG. 5 is a fragmentary side view of a cassette assembly with parts removed to show inner components, including a traveling pulley assembly and a stationary pulley assembly with a utility line in a partially extended state.
Figure 6:
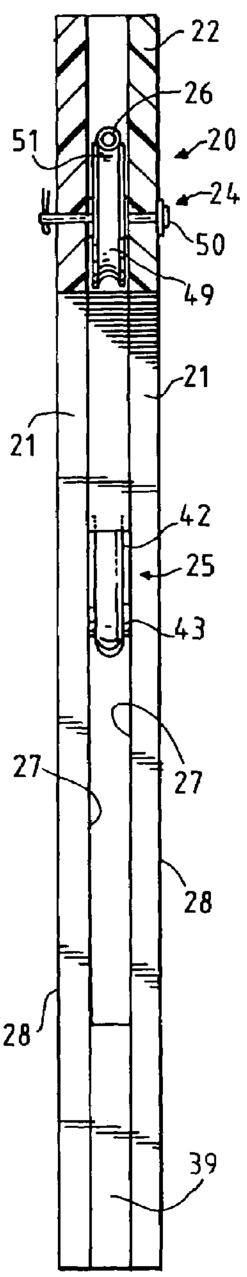
FIG. 6 is a fragmentary anterior end view of the cassette assembly as shown in FIG. 5.

Stationary pulley assembly 24 preferably comprises a second pulley 49 as illustrated and referenced in FIGS. 1–3, and 5–10, and cassette attachment means 50 as illustrated and referenced in FIGS. 2, 3, and 6. Second pulley 49 is preferably constructed from nylon or similar other type material. The cassette attachment means 50 are designed to rotatably attach stationary pulley assembly 24 to pulley-receiving walls 21 of utility line cassette 20. Second pulley 49 preferably comprises a superior pulley region 51 as illustrated and referenced in FIGS. 2, 3, and 5–10; a central stationary hub 52 as illustrated and referenced in FIGS. 2, and 7–10; and a second utility line-accepting groove 53 as illustrated and referenced in FIGS. 2 and 3. It will be seen from an inspection of FIG. 2 that central stationary hub 52 has a stationary hub axis as referenced at 52(*a*) about which second pulley 49 freely rotates.

Each pulley-receiving wall 21 preferably further comprises stationary pin receiving structure or a pin-receiving tunnel, which extends from the inner wall surfaces 27 to outer wall surfaces 28 adjacent anterior line outlet end 22. Cassette attachment means 50 may preferably be defined by comprising a stationary pin assembly generally illustrated in FIGS. 2 and 3. From an inspection of the noted drawing figures, it will be seen that the stationary pin assembly preferably comprises a stationary pin 62 as illustrated in FIG. 3, a pair of pin washers 63 (one of which has been illustrated in FIG. 3), and retaining means. It is contemplated that in the preferred embodiment, the retaining means may be defined by a clevis pin or cotter pin type fastening means at one stationary pin end and may be further defined by a pin head at the second stationary pin head. In this regard, it will be seen that stationary pin 62 comprises laterally opposite stationary pin ends and a stationary pin length intermediate the stationary pin ends. The stationary pin length is insertable through central stationary hub 52 as most clearly illustrated in FIG. 3. It will be further seen that the stationary pin ends are receivable in the stationary pin receiving structure or pin end-receiving tunnels in pulley-receiving walls 21. The retaining means thus function to retain the stationary pin ends in the stationary pin-receiving structure and the pin washers 63 are cooperatively associated with both the stationary pin ends and the retaining means for relieving friction between the retaining means and outer wall surfaces 28.

It is further contemplated that second pulley 49 may comprise two different types of pulleys depending on the type of utility line 26 being used with cassette assembly 20 as previously outlined. If utility line 26 is either Saliva Ejector Valve (SEV) type tubing, 3-Way Syringe type tubing, or Hand-Piece type tubing, it is contemplated that second pulley 49 preferably comprise a 2.5-inch diameter having a superior pulley region 51 (as well as a second pulley, inferior pulley region) measuring about 0.875 inches. The diameter of central stationary hub 52 further preferably measures about 0.75 inches. Together, the radial measurements of superior pulley region 51, the second pulley, inferior pulley region, and central stationary hub 52 thus comprise the 2.5-inch preferred diameter. The preferred width of the 2.5-inch diameter second pulley 49 is about 0.75 inches. The preferred depth of second utility line-accepting groove 53 is about 0.375 inches. A pin-length-receiving tunnel extends through central stationary hub 52 as earlier referenced and the preferred diameter of the pin-length receiving tunnel (as well as the pin end-receiving tunnels) measures about 0.203 inches.

If utility line 26 is High Vacuum Evacuator (HVE) type tubing, it is contemplated that second pulley 49 preferably comprise a 3.5-inch diameter having a superior region 51 (as well as a second pulley inferior region) measuring about 1.375 inches. The diameter of central stationary hub 52 further preferably remains constant at about 0.75 inches. Together, the radial measurements of superior region 51, the second pulley inferior region, and central stationary hub 52 thus comprise the 3.5-inch preferred diameter. The preferred width of the 3.5-inch diameter second pulley 49 is about 1 inch. The preferred depth of second utility line-accepting groove 53 remains constant at about 0.375 inches. The preferred diameter of the pin-length receiving tunnel (as well as the pin end-receiving tunnels) remains constant at about 0.203 inches.

Additionally, it will be noted that in the preferred embodiment, second pulley 49 comprises friction-relieving means for relieving friction between second pulley 49 and inner wall surfaces 27. In this regard, it is contemplated that the friction-relieving means may preferably be defined by comprising laterally opposite pulley shoulders 64 adjacent central stationary hub 52 as generally illustrated in FIGS. 2 and 3. Excellent results have been obtained utilizing pulley shoulders 64 in combination with second pulley 49 to reduce not only frictional forces but also to reduce noise created from otherwise improper frictional contact intermediate second pulley 49 and inner wall surfaces 27.

The preferred spacer means are designed to maintain pulley-receiving walls 21 in substantially parallel, laterally spaced relation and generally comprise anterior spacer structure and posterior spacer structure. The anterior spacer structure preferably comprises an anterior-superior spacer element 38 as illustrated and referenced in FIGS. 1, and 7–10; an anterior-inferior spacer element 39 is FIGS. 5 and 6. The posterior spacer structure preferably comprises a posterior-superior spacer element 40 as illustrated and referenced in FIGS. 1, 2, 5, and 7–10; and a posterior-inferior spacer element 41 as illustrated and referenced in FIGS. 1, 5, and 7. Each of the spacer elements, namely, anterior-superior spacer element 38, anterior-inferior spacer element 39, posterior-superior spacer element 40, and posterior-inferior spacer element 41 preferably comprise a substantially uniform spacer lateral width and each are preferably constructed from 0.375-inch thick Type 1 (gray) PVC. The uniform spacer lateral width is dependent upon the types of pulleys employed as previously specified. It is contemplated, however, that the uniform spacer lateral width roughly approximate the pulley width so as to minimize the amount of rotation about an axis extending through the diameter of the pulley perpendicular to central traveling hub axis 44(*a*). It is contemplated that a substantially uniform spacer lateral width for each spacer element will effectively maintain pulley-receiving walls 21 in substantially parallel, laterally spaced relation. Each spacer element is affixed to the pulley-receiving walls via any number of fastening means, including, but not limited to adhesive fastening means and/or screw-type fastening means.

Utility line 26 essentially comprises an instrument end 54 as illustrated and referenced in FIGS. 1, 5, and 7–10; an instrument-actuating end 55 as illustrated and referenced in FIGS. 1, 5, and 7–10; and a utility line length intermediate instrument end 54 and instrument-actuating end 55. It will be seen from an inspection of the noted drawing figures that the utility line length is preferably cooperatively associated with both (1) first utility line-accepting groove 45 adjacent inferior pulley region 43 of first pulley 42 of travelling pulley assembly 25 and (2) second utility line-accepting groove 53 adjacent superior pulley region 51 of second pulley 49 of stationary pulley assembly 24. Utility line 26 is thus trained through utility line accepting grooves 45 and 53 from posterior line inlet end 23 to anterior line outlet end 22. In this regard, it will be understood that utility line 26 through physical contact with the described structures, imparts motion to both first pulley 42 and second pulley 49, first pulley 42 being rotatable about traveling hub axis 44(*a*) and second pulley 49 being rotatable about stationary hub axis 52(*a*). Additionally, utility line 26 imparts traveling motion to traveling pulley assembly 25 as discussed in more detail hereinafter.

Instrument-actuating end 55 is spatially located adjacent posterior line inlet end 23 as generally depicted in FIGS. 5, and 7–10, and instrument end 54 is spatially located adjacent anterior line outlet end 22 as generally depicted in FIGS. 5, and 7–10. It will be understood from a general inspection of FIG. 1 that instrument end 54 is cooperatively associated with an instrument 56. Instrument end 54 is thus selectively extendable from anterior line outlet end 22 for utility line (and instrument) use and is also selectively retractable into anterior line outlet end 22 for utility line (and instrument) storage. FIG. 1 generally illustrates one instrument end 54 in a partially extended state and further generally illustrates three instrument ends 54 in a retracted, storage-type state. When instrument end 54 or ends 54 are in a retracted state, traveling pulley assembly 25 is preferably spatially located at a point along inferior track path 31 at a retracted-state rest stop as generally depicted in phantom in FIG. 5 at reference numeral 57. The weight of traveling pulley assembly 25 normally keeps utility line 26 under tension.

Figures 7, 8:
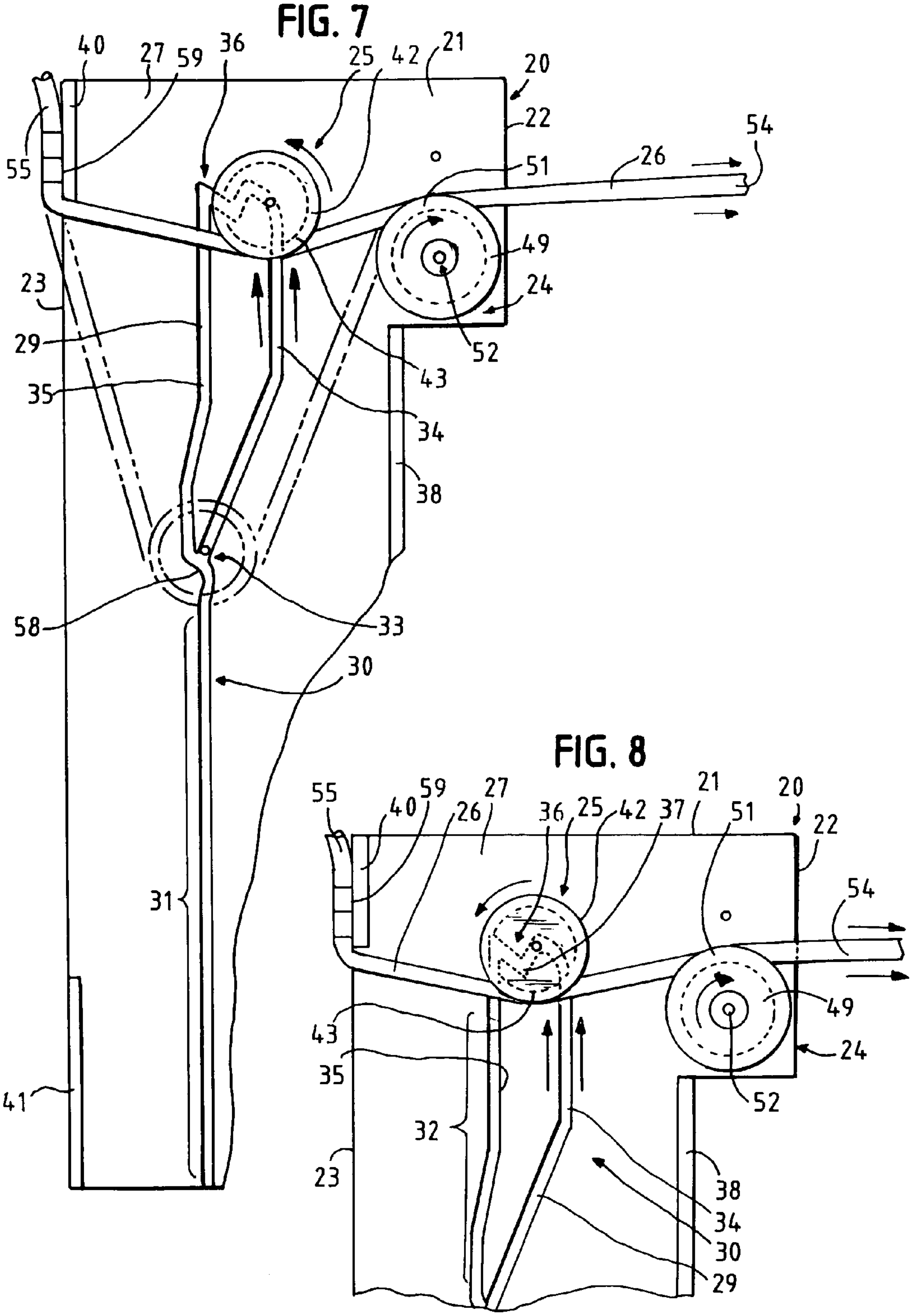
FIG. 7 is a fragmentary side view of a cassette assembly with parts removed to show inner components, including a traveling pulley assembly and a stationary pulley assembly with a utility line in a fully extended state.
FIG. 8 is a fragmentary side view of a superior portion of a cassette assembly with parts removed to show inner components, including a traveling pulley assembly and a stationary pulley assembly, the travelling pulley assembly descending into an extended-state rest stop.
Figure 9:
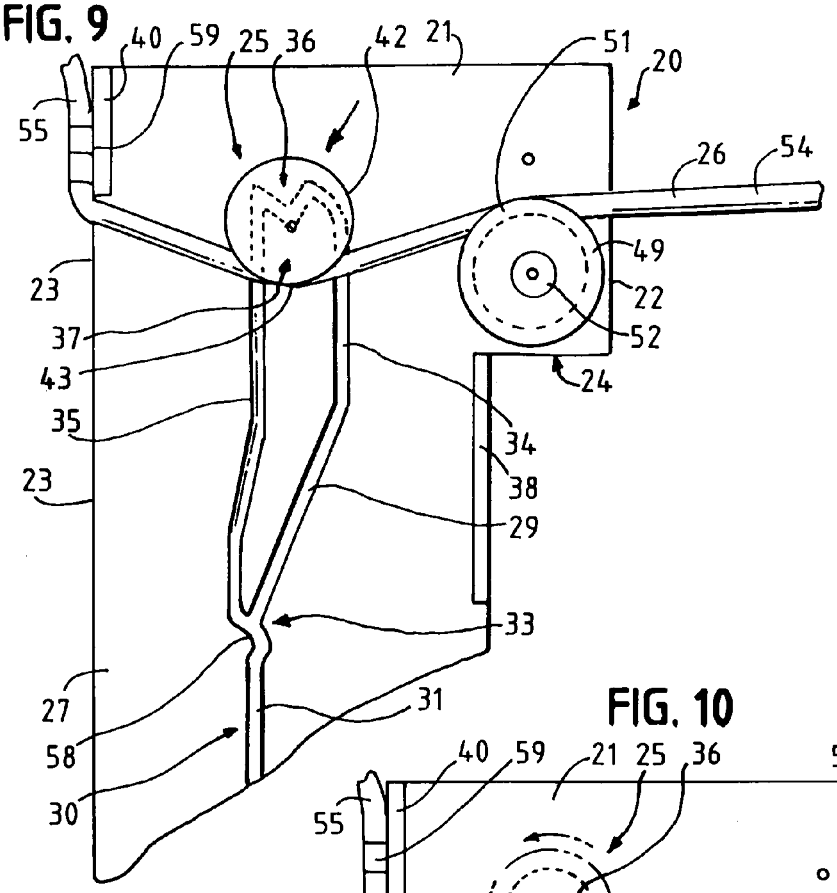
FIG. 9 is a fragmentary side view of a superior portion of a cassette assembly with parts removed to show inner components, including a traveling pulley assembly and a stationary pulley assembly, the travelling pulley assembly seated in an extended-state rest stop.

When external forces are applied to instrument end 54, such as when a user wishes to utilize instrument 56, added tension is created in utility line 26. This tension causes instrument end 54 to extend into space adjacent anterior line outlet end and further causes the utility line length to rise or ascend as generally depicted or illustrated in FIGS. 1 and 5. Being cooperatively associated with first utility line-accepting groove 45 adjacent inferior pulley region 43 of first pulley 42 of travelling pulley assembly 25, the utility length imparts traveling motion to traveling pulley assembly 25 as further illustrated in FIGS. 1 and 5. When traveling motion is thus imparted to traveling pulley assembly 25, traveling pulley assembly 25 travels an orderly extension-retraction path. Starting from retracted-state rest stop 57, tension (and interactive forces at first pulley 42) causes traveling pulley assembly to rise as generally depicted in FIGS. 1 and 5. When traveling pulley assembly 25 approaches pulley guide junction 33, traveling pulley assembly is guided into anterior track path 34 as generally depicted in FIG. 7. Preferably, it is contemplated that track guide means may function to more effectively guide traveling pulley assembly 25 into anterior track path 34 from pulley guide junction 33.

In this regard, the track guide means may be defined by several mechanisms. In the first instance, the track guide means may be defined by a track offset 58 adjacent the pulley guide junction as illustrated and referenced in FIGS. 1, 2, 5, 7, and 9. It will be seen from an inspection of the noted drawing figures that track offset 58 preferably comprises pronounced inner wall surface structure (or a bump) for directing traveling pulley assembly 25 into anterior track path 34 from pulley guide junction 33. Secondly, it is contemplated that traveling pulley assembly 25 may be effectively guided or driven into anterior track path 34 from pulley guide junction 33 by the utility line length of utility line 26. In this regard, it will be recalled that the spacer means preferably comprise posterior-superior spacer element 40. Preferably, posterior-superior spacer element 40 comprises a line-engaging surface 59 as generally illustrated and depicted in FIGS. 5, and 7–10. Line-engaging surface 59 effectively creates a bend in the utility line length at the inferior most end of posterior-superior spacer element 40. It will thus be seen that as traveling pulley assembly 25 approaches pulley guide junction 33, an angle θ exists between the anterior utility line length (60) and the posterior line length (61) as referenced in FIG. 5. It will be seen that the vertex of angle θ is slightly posterior to inferior track path 31. Thus, under traveling pulley assembly 25 will travel along the anterior most portion of inferior track path 31 due to gravitational forces (this is akin to a displaced pendulum (or pendulum-like) system that is seeking its equilibrium position). Thus, posterior-superior spacer element 40 functions to impart a pulley guide angle θ to utility line 26 as traveling pulley assembly 25 travels through pulley guide junction 33. Pulley guide angle θ (along with its offset from equilibrium as referenced at (hereinafter collectively referred to or defined by "pulley guide angle") functions to guide traveling pulley assembly 25 into anterior track path 34 from pulley guide junction 33. Thus, it will be seen that the track guide means may preferably be defined by track offset 58 as well as pulley guide angle θ.

Figure 10:
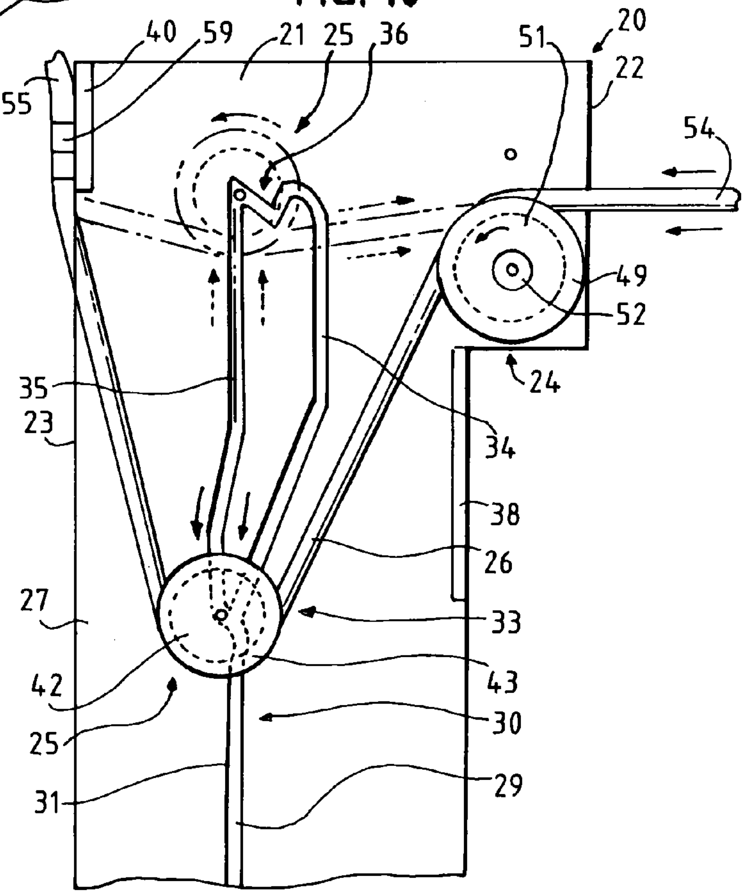
FIG. 10 is a fragmentary side view of a superior portion of a cassette assembly with parts removed to show inner components, including a traveling pulley assembly and a stationary pulley assembly, the travelling pulley assembly descending along a posterior track path.
Figure 11:
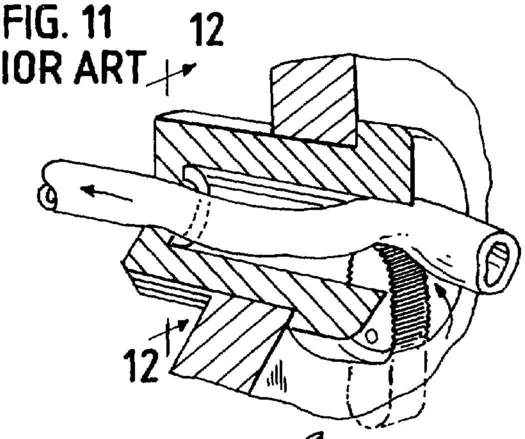
FIG. 11 PRIOR ART
FIG. 11 is a fragmentary perspective view of a first prior art utility line braking system with parts removed to show a serrated edge braking member juxtaposed and in frictional, pinched contact with a utility line.

Continued tension in utility line 26 causes traveling pulley assembly 25 to ascend in anterior track path 34 to superior track path 36 as further illustrated in FIG. 7. After reaching superior track path 36, traveling pulley assembly 25 descends under net gravitational forces into extended-state rest stop 37 as comparatively illustrated in FIGS. 8 and 9. While traveling pulley assembly 25 is seated or at rest in extended-state rest stop 37, the user may utilize instrument 56 with sufficient utility line length of utility line 26. When use of instrument 56 is no longer required or desired, the user may retract instrument end 54 by imparting tension on utility line 26 thus causing traveling pulley assembly 25 to again ascend. However, the path of ascension is directed rearward along superior track path 36 toward posterior track path 35 as generally depicted in FIG. 10. Once in posterior track path 35, traveling pulley assembly 25 may then travel under net gravitational forces to pulley guide junction 33 as further generally illustrated in FIG. 10. Typically, instrument end 54 is returned to a fully retracted state and traveling pulley assembly 25 thus exits pulley guide junction 33 and returns to retracted-state rest stop 57 as earlier described and referenced in FIG. 5. Each cassette assembly may preferably comprise traveling pulley shock absorbing means.

It is contemplated that the traveling pulley shock absorbing means may function to absorb impact of first pulley 42 as traveling pulley assembly 25 travels from pulley guide junction 33 to retracted-state rest stop 57 along inferior track path 31. In other words, the retraction of utility line 26 comprises net gravitational forces that may result in first pulley 42 contacting matter located inferior to cassette assembly 20. To reduce the harmful effects of repeated impact contact with surfaces or matter located in inferior adjacency to cassette assembly 20, it is contemplated that the inferior most portion of cassette assembly 20 may comprise shock-absorbing means, which, it is further contemplated, preferably comprise impact-resistant foam padding. Excellent results have been obtained using 0.25-inch thick closed cell soft white ionomer type padding 70 as illustrated and referenced in FIG. 5. The impact resistant foam padding preferably further comprises a foam pad lateral width, the magnitude of which is substantially equal in magnitude to the spacer lateral width earlier specified.

Thus, when instrument end 54 is systematically extended and retracted as described hereinabove, the orderly extension-retraction path comprises a distinct set or series of path steps, the path steps comprising: (1) traveling from retracted-state rest stop 57 to pulley guide junction 33 along inferior track path 31; (2) traveling from pulley guide junction 33 to superior track path 36 along anterior track path 34; (3) traveling from anterior track path 34 to extended-state rest stop 37 along superior track path 36; (4) traveling from extended-state rest stop 37 to posterior track path 35 along superior track path 36; (5) traveling from superior track path 36 to pulley guide junction 33 along posterior track path 35; and (6) traveling from pulley guide junction 33 to retracted-state rest stop 57 along inferior track path 31. It will thus be seen that the orderly extension-retraction path is cyclical in nature and comprises a rest stop at extended-state rest stop 37 while the user utilizes instrument 56. Thus, each utility line cassette 20 enables users thereof to selectively extend utility line 26 for utility line use and selectively retract the utility line 26 for utility line storage.

It is contemplated that the typical installation application of the present invention is in dental practice settings. Traditionally, utility lines for various dental instruments were kept in open view and often became tangled and damaged due to various behaviors characteristic of dental offices. As will be understood, the cassette assembly here defined attempts to address both of the noted shortcomings of traditional dental utility line set-ups. Dental practitioners and others who could benefit from an extendable and retractable utility line apparatus, may further wish to house the cassette assembly or cassette assemblies behind decorative cabinetry so as to enhance the visual appeal of the dental office (or similar other setting). Thus, it is contemplated that the present invention may further comprise a cassette-enclosing cabinet 65 as illustrated in FIG. 1.

Cassette-enclosing cabinet 65 essentially comprises an interior cassette-enclosing chamber 66, an exterior cabinet surface 67, cassette-access means, and instrument end outlet means 68 intermediate interior cassette-enclosing chamber 66 and exterior cabinet surface 67 all as further illustrated and referenced in FIG. 1. It will thus be understood that the cassette-enclosing cabinet 65 functions to enclose utility line cassettes 20, which may preferably be arranged in side by side relation as generally illustrated in FIG. 1. The cassette access means function to enabling users or maintenance personnel to gain access to utility line cassettes 20 for replacement, repair or other similar type service need. It should be noted in this last regard that the vinyl tubing of most dental applications do require replacement after becoming dry and/or brittle after extended use. This is the primary maintenance issue requiring attention with the cassette assembly or utility line cassette 20.

It is contemplated that the cassette access means may preferably be defined by comprising a swivel type door (not specifically illustrated) so that access may be gained to interior cassette-enclosing chamber 66 and cassette assemblies 20 relatively easily. Cassette access means of this type are believed to be within the ordinary skill of those in the art and thus it is contemplated that no further descriptions are required for the purpose of this specification. However, it should be noted that instrument end outlet means 68 function to channel or allow passage of instrument ends 54 from anterior line outlet end 22 to exterior cabinet surface 67 as generally illustrated in FIG. 1. The instrument end outlet means 68 may preferably be defined by comprising utility line receiving tunnels formed in the cabinetry and leading from the interior cassette-enclosing chamber 66 to exterior surface 67 adjacent anterior line outlet end 22 so as to allow more effective extension and retraction of utility line 26. It will thus be seen that cassette-enclosing cabinet 65 is designed primarily to concealing utility line cassettes or cassette assemblies 20 from view.

While the above description contains much specificity, this specificity should not be construed as limitations on the scope of the invention, but rather as an exemplification of the invention. For example, it is contemplated that the present invention may comprise fewer components, yet still enable a user to selectively extend a utility line for utility line use and selectively retract the utility line for utility line storage. In this regard, it is contemplated that the cassette assembly essentially comprises two laterally spaced pulley-receiving walls, an anterior line outlet end, a posterior line inlet end, a traveling pulley assembly, and a utility line extending from the posterior line inlet end to the anterior line outlet end. Each pulley-receiving wall essentially comprises an inner wall surface and pulley-receiving structure, the pulley-receiving structure being formed in the inner wall surfaces for cooperatively forming a pulley-receiving track. The pulley-receiving track essentially comprises a superior track region and a pulley guide junction. The superior track region essentially comprises an ascension track path, a descension track path, and an extended-state rest stop intermediate the ascension track path and the descension track path. The ascension track path and the descension track path intersect at the pulley guide junction.

Further, a utility line, insertable through the utility line cassette essentially comprises a first line end, a second line end, and a line length intermediate the first and second line ends. The line length is thus cooperatively associated with the traveling pulley assembly for imparting motion thereto. The first line end is selectively extendable from the anterior line outlet end for utility line use and selectively retractable into the anterior outlet for utility line storage. When the utility line is systematically extended and retracted, the traveling pulley assembly travels an orderly extension-retraction path. The orderly extension-retraction path comprises a series of path steps, the path steps comprising (1) traveling from the pulley guide junction to the extended-state rest stop along the ascension track path and (2) traveling from the extended-state rest stop to the pulley guide junction along the descension track path. Thus, it will be seen that the cassette assembly as here described also effectively enables a user to selectively extend the utility line for utility line use and selectively retract the utility line for utility line storage.

Additionally, it is contemplated that friction-relieving means may be situated adjacent the anterior line outlet end for relieving friction intermediate the utility line and the anterior line outlet end. In this regard, a stationary pulley assembly would be the preferred structural component to relieve friction, although it is contemplated that other friction-relieving means would fall within the scope of the present invention. Provided a stationary pulley assembly is utilized to relieve friction, the stationary pulley assembly essentially comprises a rotatable pulley and cassette attachment means, substantially as earlier described. It will be recalled that the rotatable pulley may comprise laterally opposite pulley shoulders, the pulley shoulders for further relieving friction between the rotatable pulley and the inner wall surfaces.

Further, it is contemplated that the cassette assembly may comprise traveling pulley shock absorbing means for absorbing impact of the traveling pulley assembly as the traveling pulley assembly travels along the orderly extension-retraction path. In this regard, the traveling pulley shock absorbing means may be defined by select shock absorbing structure, the select shock-absorbing structure being selected from the group consisting of the shock-absorbing core and impact-resistant foam padding, substantially as earlier described. It will be recalled that the shock-absorbing core is designed for absorbing impact of the inner wall surfaces as the traveling pulley assembly travels along the orderly extension-retraction path. Further, the foam padding is designed for absorbing impact of the traveling pulley assembly as the traveling pulley assembly travels from the descension track path through the pulley guide junction.

Accordingly, although the invention has been described by reference to a preferred embodiment, it is not intended that the novel assembly be limited thereby, but that modifications thereof are intended to be included as falling within the broad scope and spirit of the foregoing disclosure, the following claims and the appended drawings.

I claim:

1. A utility line extension and retraction system, the utility line extension and retraction system for enabling a user to selectively extend a utility line for utility line use and retract the utility line for utility line storage, the utility line extension and retraction system comprising:

a plurality of utility line cassettes, each utility line cassette comprising two laterally-spaced, pulley-receiving walls, spacer means intermediate the pulley-receiving walls, an anterior line outlet end, a posterior line inlet end, a stationary pulley assembly adjacent the anterior line outlet end, a traveling pulley assembly intermediate the anterior line outlet end and the posterior line inlet end, and a utility line extending from the posterior line inlet end to the anterior line outlet end, each pulley-receiving wall comprising an inner wall surface, an outer wall surface, and a pulley-receiving groove intermediate the inner wall surface and the outer wall surface, the pulley-receiving grooves cooperatively forming a pulley-receiving track, the pulley-receiving track comprising an inferior track path, a superior track region, and a pulley guide junction intermediate the inferior track path and the superior track region, the superior track region comprising an anterior track path, a posterior track path, and a superior track path intermediate the anterior track path and the posterior track path, the anterior track path, the posterior track path, and the inferior track path intersecting at the pulley guide junction, the superior track path comprising an extended-state rest stop, the extended-state rest stop for braking the utility line when in extended utility line use, the spacer means for maintaining the pulley-receiving walls in laterally spaced relation, the traveling pulley assembly comprising a first pulley and track-traveling means, the first pulley comprising an inferior pulley region, a central traveling hub aperture, and a first utility line-accepting groove, the central traveling hub aperture having a traveling hub axis, the track traveling means being located in the central traveling hub aperture for enabling the traveling pulley assembly to travel along the pulley-receiving track, the stationary pulley assembly comprising a second pulley and cassette attachment means, the cassette attachment means for rotatably attaching the stationary pulley assembly to the utility line cassette, the second pulley comprising a superior pulley region, a central stationary hub, and a second utility line-accepting groove, the central stationary hub having a stationary hub axis, the utility line comprising an instrument end, an instrument-actuating end, and a utility line length intermediate the instrument end and the instrument-actuating end, the utility line length being cooperatively associated with the first and second utility line-accepting grooves adjacent the inferior and superior pulley regions for imparting motion to the first and second pulleys, the first pulley rotatable about the traveling hub axis, the second pulley rotatable about the stationary hub axis, the instrument-actuating end located adjacent the posterior line inlet end, the instrument end located adjacent the anterior line outlet end, the instrument end cooperatively associated with an instrument, the instrument end being selectively extendable from the anterior line outlet end for utility line use and selectively retractable into the anterior outlet for utility line storage, the traveling pulley assembly located in the inferior track path at a retracted-state rest stop when the instrument end is in a retracted state, the traveling pulley assembly traveling an orderly extension-retraction path when the instrument end is systematically extended and retracted, the orderly extension-retraction path comprising a series of path steps, the path steps comprising:

traveling from the retracted-state rest stop to the pulley guide junction along the inferior track path;

traveling from the pulley guide junction to the superior track path along the anterior track path;

traveling from the anterior track path to the extended-state rest stop along the superior track path;

traveling from the extended-state rest stop to the posterior track path along the superior track path;

traveling from the superior track path to the pulley guide junction along the posterior track path; and traveling from the pulley guide junction to the retracted-state rest stop along the inferior track path, each utility line cassette thus enabling a user to selectively extend the utility line for utility line use and selectively retract the utility line for utility line storage.

2. The utility line extension and retraction system of claim 1 wherein the pulley-receiving track comprises track guide means, the track guide means for directing the traveling pulley assembly into the anterior track path from the pulley guide junction.

3. The utility line extension and retraction system of claim 2 wherein the track guide means is defined by a track offset adjacent the pulley guide junction, the track offset comprising pronounced inner wall surface structure for directing the traveling pulley assembly into the anterior track path from the pulley guide junction.

4. The utility line extension and retraction system of claim 1 wherein the track-traveling means comprise a shock-absorbing core and a track-traveling pin, the shock-absorbing core located in the central traveling hub aperture, the track-traveling pin comprising laterally opposite groove-engaging ends and a pin length intermediate the groove-engaging ends, the pin length extending through the shock-absorbing core, the groove-engaging ends being received in the pulley-receiving track for enabling the traveling pulley assembly to travel along the pulley-receiving track, the shock-absorbing core for absorbing impact of the inner wall surfaces as the traveling pulley assembly travels along the orderly extension-retraction path.

5. The utility line extension and retraction system of claim 1 wherein the pulley-receiving walls each comprise stationary pin receiving structure extending from the inner wall surfaces to the outer wall surfaces, the stationary pin receiving structure located adjacent the anterior line outlet end, the cassette attachment means comprising a stationary pin assembly, the stationary pin assembly comprising a stationary pin, a pair of pin washers, and retaining means, the stationary pin comprising laterally opposite stationary pin ends and a stationary pin length intermediate the stationary pin ends, the stationary pin length insertable through the central stationary hub, the stationary pin ends receivable in the stationary pin receiving structure, the retaining means for retaining the stationary pin ends in the stationary pin-receiving structure, the pin washers cooperatively associated with the stationary pin ends and the retaining means for relieving friction between the retaining means and the outer wall surfaces.

6. The utility line extension and retraction system of claim 1 wherein the second pulley comprises friction-relieving means, the friction relieving means for relieving friction between the second pulley and the inner wall surfaces.

7. The utility line extension and retraction system of claim 6 wherein the friction-relieving means is defined by laterally opposite pulley shoulders adjacent the central stationary hub, the pulley shoulders for relieving friction between the second pulley and the inner wall surfaces.

8. The utility line extension and retraction system of claim 1 wherein the spacer means comprises anterior spacer structure and posterior spacer structure, the anterior spacer structure comprising an anterior-superior spacer element and an anterior-inferior spacer element, the posterior spacer structure comprising a posterior-superior spacer element and a posterior-inferior spacer element, the anterior-superior spacer element, anterior-inferior spacer element, the posterior-superior spacer element, and the posterior-inferior spacer element each comprising a substantially uniform spacer lateral width, the spacer lateral width being substantially uniform for maintaining the pulley-receiving walls in substantially parallel, laterally spaced relation.

9. The utility line extension and retraction system of claim 8 wherein the posterior-superior spacer element comprises a line-engaging surface, the line-engaging surface for imparting a pulley guide angle to the utility line as the traveling pulley assembly travels through the pulley guide junction, the pulley guide angle for guiding the traveling pulley assembly into the anterior track path from the pulley guide junction, the track guide means thus being defined by the track offset and the pulley guide angle.

10. The utility line extension and retraction system of claim 1 wherein each utility line cassette comprises traveling pulley shock absorbing means, the traveling pulley shock absorbing means for absorbing impact of the first pulley as the traveling pulley assembly travels from the pulley guide junction to the retracted-state rest stop along the inferior track path.

11. The utility line extension and retraction system of claim 10 wherein the traveling pulley shock absorbing means comprise foam padding, the foam padding comprising a foam pad lateral width, the lateral foam lateral pad width being substantially equal in magnitude to the spacer lateral width.

12. The utility line extension and retraction system of claim 1 wherein the utility line extension and retraction system comprises a cassette-enclosing cabinet, the cassette-enclosing cabinet comprising an interior cassette-enclosing chamber, an exterior cabinet surface, cassette-access means, and instrument end outlet means intermediate the interior cassette-enclosing chamber and the exterior cabinet surface, the cassette-enclosing cabinet enclosing the utility line cassettes, the utility line cassettes arranged in side by side relation, the cassette access means for enabling access to the utility line cassettes, the instrument end outlet means for channeling the instrument ends from the anterior line outlet ends to the exterior cabinet surface, the cassette-enclosing cabinet thus for concealing the utility line cassettes from view.

13. A utility line extension and retraction cassette assembly, the cassette assembly for enabling a user to selectively extend a utility line for utility line use and selectively retract the utility line for utility line storage, the cassette assembly comprising two laterally spaced pulley-receiving walls, spacer means intermediate the pulley-receiving walls, an anterior line outlet end, a posterior line inlet end, a stationary pulley assembly adjacent the anterior line outlet end, a traveling pulley assembly intermediate the anterior line outlet end and the posterior line inlet end, and a utility line extending from the posterior line inlet end to the anterior line outlet end, each pulley-receiving wall comprising an inner wall surface, an outer wall surface, and a pulley-receiving groove intermediate the inner wall surface and the outer wall surface, the pulley-receiving grooves cooperatively forming a pulley-receiving track, the pulley-receiving track comprising an inferior track path, a superior track region, and a pulley guide junction intermediate the inferior track path and the superior track region, the superior track region comprising an anterior track path, a posterior track path, and a superior track path intermediate the anterior track path and the posterior track path, the anterior track path, the posterior track path, and the inferior track path intersecting at the pulley guide junction, the superior track path comprising an extended-state rest stop, the extended-state rest stop for braking the utility line when in extended utility line use, the spacer means for maintaining the pulley-receiving walls in laterally spaced relation, the traveling pulley assembly comprising a first pulley and track-traveling means, the first pulley comprising an inferior pulley region, a central traveling hub aperture, and a first utility line-accepting groove, the central traveling hub aperture having a traveling hub axis, the track traveling means located in the central traveling hub aperture for enabling the traveling pulley assembly to travel along the pulley-receiving track, the stationary pulley assembly comprising a second pulley and cassette attachment means, the cassette attachment means for rotatably attaching the stationary pulley assembly to the utility line cassette, the second pulley comprising a superior pulley region, a central stationary hub, and a second utility line-accepting groove, the central stationary hub having a stationary hub axis, the utility line comprising an instrument end, an instrument-actuating end, and a utility line length intermediate the instrument end and the instrument-actuating end, the utility line length being cooperatively associated with the first and second utility line-accepting grooves adjacent the inferior and superior pulley regions for imparting motion to the first and second pulleys, the first pulley rotatable about the traveling hub axis, the second pulley rotatable about the stationary hub axis, the instrument-actuating end located adjacent the posterior line inlet end, the instrument end located adjacent the anterior line outlet end, the instrument end being selectively extendable from the anterior line outlet end for utility line use and selectively retractable into the anterior outlet for utility line storage, the traveling pulley assembly located in the inferior track path at a retracted-state rest stop when the instrument end is in a retracted state, the traveling pulley assembly traveling an orderly extension-retraction path when the instrument end is systematically extended and retracted, the orderly extension-retraction path comprising a series of path steps, the path steps comprising:

- traveling from the retracted-state rest stop to the pulley guide junction along the inferior track path;
- traveling from the pulley guide junction to the superior track path along the anterior track path;
- traveling from the anterior track path to the extended-state rest stop along the superior track path;
- traveling from the extended-state rest stop to the posterior track path along the superior track path;
- traveling from the superior track path to the pulley guide junction along the posterior track path; and
- traveling from the pulley guide junction to the retracted-state rest stop along the inferior track path, the cassette assembly thus enabling a user to selectively extend the utility line for utility line use and selectively retract the utility line for utility line storage.

14. The cassette assembly of claim 13 wherein the pulley-receiving track comprises track guide means, the track guide means for directing the traveling pulley assembly into the anterior track path from the pulley guide junction.

15. The cassette assembly of claim 14 wherein the track guide means is defined by a track offset adjacent the pulley guide junction, the track offset comprising pronounced inner wall surface structure for directing the traveling pulley assembly into the anterior track path from the pulley guide junction.

16. The cassette assembly of claim 13 wherein the track-traveling means comprise a shock-absorbing core and a track-traveling pin, the shock-absorbing core located in the central traveling hub aperture, the track-traveling pin comprising laterally opposite groove-engaging ends and a pin length intermediate the groove-engaging ends, the pin length extending through the shock-absorbing core, the groove-engaging ends being received in the pulley-receiving track for enabling the traveling pulley assembly to travel along the pulley-receiving track, the shock-absorbing core for absorbing impact of the inner wall surfaces as the traveling pulley assembly travels along the orderly extension-retraction path.

17. The cassette assembly of claim 13 wherein the pulley-receiving walls each comprise stationary pin receiving structure extending from the inner wall surfaces to the outer wall surfaces, the stationary pin receiving structure located adjacent the anterior line outlet end, the cassette attachment means comprising a stationary pin assembly, the stationary pin assembly comprising a stationary pin, a pair of pin washers, and retaining means, the stationary pin comprising laterally opposite stationary pin ends and a stationary pin length intermediate the stationary pin ends, the stationary pin length insertable through the central stationary hub, the stationary pin ends receivable in the stationary pin receiving structure, the retaining means for retaining the stationary pin ends in the stationary pin-receiving structure, the stationary pin washers cooperatively associated with the stationary pin ends and the retaining means for relieving friction between the retaining means and the outer wall surfaces.

18. The cassette assembly of claim 13 wherein the second pulley comprises friction-relieving means, the friction relieving means for relieving friction between the second pulley and the inner wall surfaces.

19. The cassette assembly of claim 18 wherein the friction-relieving means is defined by laterally opposite pulley shoulders adjacent the central stationary hub, the pulley shoulders for relieving friction between the second pulley and the inner wall surfaces.

20. The cassette assembly of claim 13 wherein the spacer means comprises anterior spacer structure and posterior spacer structure, the anterior spacer structure comprising an anterior-superior spacer element and an anterior-inferior spacer element, the posterior spacer structure comprising a posterior-superior spacer element and a posterior-inferior spacer element, the anterior-superior spacer element, anterior-inferior spacer element, the posterior-superior spacer element, and the posterior-inferior spacer element each comprising a substantially uniform spacer lateral width, the spacer lateral width being substantially uniform for maintaining the pulley-receiving walls in substantially parallel, laterally spaced relation.

21. The cassette assembly of claim 20 wherein the posterior-superior spacer element comprises a line-engaging surface, the line-engaging surface for imparting a pulley guide angle to the utility line as the traveling pulley assembly travels through the pulley guide junction, the pulley guide angle for guiding the traveling pulley assembly into the anterior track path from the pulley guide junction, the track guide means thus being defined by the track offset and the pulley guide angle.

22. The cassette assembly of claim 13 wherein the cassette assembly comprises traveling pulley shock absorbing means, the traveling pulley shock absorbing means for absorbing impact of the first pulley as the traveling pulley assembly travels from the pulley guide junction to the retracted-state rest stop along the inferior track path.

23. The cassette assembly of claim 22 wherein the traveling pulley shock absorbing means comprise foam padding, the foam padding comprising a foam pad lateral width, the lateral foam lateral pad width being substantially equal in magnitude to the spacer lateral width.

24. The cassette assembly of claim 13 wherein the cassette assembly comprises a cassette-enclosing cabinet, the cassette-enclosing cabinet comprising an interior cassette-enclosing chamber, an exterior cabinet surface, cassette-access means, and instrument end outlet means, the cassette-enclosing cabinet enclosing the cassette assembly, the cassette access means for enabling access to the cassette assembly, the instrument end outlet means for channeling the instrument end from the anterior line outlet end to the exterior cabinet surface, the cassette-enclosing cabinet thus for concealing the cassette assembly from view.

25. A utility line extension and retraction cassette assembly, the cassette assembly for enabling a user to selectively extend a utility line for utility line use and selectively retract the utility line for utility line storage, the cassette assembly comprising two laterally spaced pulley-receiving walls, an anterior line outlet end, a posterior line inlet end, a traveling pulley assembly, and a utility line extending from the posterior line inlet end to the anterior line outlet end, each pulley-receiving wall comprising an inner wall surface and pulley-receiving structure, the pulley-receiving structure being formed in the inner wall surfaces, the pulley-receiving structure cooperatively forming a pulley-receiving track, the pulley-receiving track comprising a superior track region and a pulley guide junction, the superior track region comprising an ascension track path, a descension track path, and an extended-state rest stop intermediate the ascension track path and the descension track path, the ascension track path and the descension track path intersecting at the pulley guide junction, the utility line comprising a first line end, a second line end, and a line length intermediate the first and second line ends, the line length being cooperatively associated with the traveling pulley assembly for imparting motion thereto, the first line end being selectively extendable from the anterior line outlet end for utility line use and selectively retractable into the anterior outlet for utility line storage.

26. The cassette assembly of claim 25 wherein the traveling pulley assembly travels an orderly extension-retraction path when the first line end is systematically extended and retracted, the orderly extension-retraction path comprising a series of path steps, the path steps comprising traveling from the pulley guide junction to the extended-state rest stop along the ascension track path, and traveling from the extended-state rest stop to the pulley guide junction along the descension track path.

27. The cassette assembly of claim 26 wherein the cassette assembly comprises traveling pulley shock absorbing means, the traveling pulley shock absorbing means for absorbing impact of the traveling pulley assembly as the traveling pulley assembly travels along the orderly extension-retraction path.

28. The cassette assembly of claim 33 wherein the traveling pulley shock absorbing means is defined by a select shock absorbing structure, the select shock-absorbing structure being selected from the group consisting of the shock-absorbing core and impact-resistant foam padding, the shock-absorbing core for absorbing impact of the inner wall surfaces as the traveling pulley assembly travels along the orderly extension-retraction path, the foam padding for absorbing impact of the traveling pulley assembly as the traveling pulley assembly travels from the descension track path through the pulley guide junction.

29. The cassette assembly of claim 25 wherein the cassette assembly comprises spacer means intermediate the pulley-receiving walls, the spacer means for maintaining the pulley-receiving walls in laterally spaced relation.

30. The cassette assembly of claim 29 wherein the spacer means comprises a posterior-superior spacer element, the posterior-superior spacer element comprising a spacer lateral width and line-engaging surface, the spacer lateral width for maintaining the pulley-receiving walls in laterally spaced relation, the line-engaging surface for imparting a pulley guide angle to the utility line as the traveling pulley assembly travels through the pulley guide junction, the pulley guide angle for guiding the traveling pulley assembly into the ascension track path from the pulley guide junction, the track guide means thus being defined by the track offset and the pulley guide angle.

31. The cassette assembly of claim 25 wherein the pulley guide junction comprises track guide means, the track guide means for directing the traveling pulley assembly into the ascension track path from pulley guide junction.

32. The cassette assembly of claim 25 wherein the track-traveling means comprise a shock-absorbing core and a track-traveling pin, the shock-absorbing core forming a central traveling hub of the traveling pulley assembly, the track-traveling pin comprising laterally opposite groove-engaging ends and a pin length intermediate the groove-engaging ends, the pin length extending through the shock-absorbing core, the groove-engaging ends being received in the pulley-receiving track for enabling the traveling pulley assembly to travel along the pulley-receiving track, the shock-absorbing core for absorbing impact of the inner wall surfaces as the traveling pulley assembly travels along the orderly extension-retraction path.

33. The cassette assembly of claim 25 wherein the cassette assembly comprises friction-relieving means adjacent the anterior line outlet end, the friction relieving means for relieving friction intermediate the utility line and the anterior line outlet end.

34. The cassette assembly of claim 33 wherein the friction-relieving means is defined by a stationary pulley assembly, the stationary pulley assembly comprising a rotatable pulley and cassette attachment means, the cassette attachment means for rotatably attaching the rotatable pulley to the cassette assembly intermediate the inner wall surfaces, the rotatable pulley comprising laterally opposite pulley shoulders, the pulley shoulders for relieving friction between the rotatable pulley and the inner wall surfaces.

35. The cassette assembly of claim 25 wherein the cassette assembly comprises a cassette assembly-enclosing cabinet, the cassette assembly-enclosing cabinet comprising an interior cassette assembly-enclosing chamber, an exterior cabinet surface, cassette assembly-access means, and first line end outlet means, the cassette assembly-enclosing cabinet enclosing the cassette assembly, the cassette assembly access means for enabling access to the cassette assembly, the first line end outlet means for channeling the first line end from the anterior line outlet end to the exterior cabinet surface, the cassette assembly-enclosing cabinet thus for concealing the cassette assembly from view.

* * * * *